United States Patent
Li

(10) Patent No.: US 9,816,689 B2
(45) Date of Patent: Nov. 14, 2017

(54) BACKLIGHT BACK PLATE, ADHESIVE-METAL INTEGRATED STRUCTURE OF BACKLIGHT SOURCE, BACKLIGHT SOURCE, AND DISPLAY PANEL

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventor: Wenjun Li, Beijing (CN)

(73) Assignees: BOE TECHNOLOGY GROUP CO., LTD., Beijing (CN); BOE OPTICAL SCIENCE AND TECHNOLOGY CO., LTD., Suzhou, Jiangsu (CN)

( * ) Notice: Subject to any disclaimer, the term of this patent is extended or adjusted under 35 U.S.C. 154(b) by 0 days.

(21) Appl. No.: 15/106,736

(22) PCT Filed: Nov. 5, 2015

(86) PCT No.: PCT/CN2015/093817
§ 371 (c)(1),
(2) Date: Jun. 20, 2016

(87) PCT Pub. No.: WO2017/000455
PCT Pub. Date: Jan. 5, 2017

(65) Prior Publication Data
US 2017/0205054 A1  Jul. 20, 2017

(30) Foreign Application Priority Data
Jun. 30, 2015 (CN) .......................... 2015 1 0374948

(51) Int. Cl.
G09F 13/04 (2006.01)
F21V 17/10 (2006.01)

(52) U.S. Cl.
CPC ................... *F21V 17/101* (2013.01)

(58) Field of Classification Search
CPC ...................................... F21V 17/101
See application file for complete search history.

(56) References Cited

U.S. PATENT DOCUMENTS

2006/0007367 A1* 1/2006 Cho .................. G02F 1/133308
349/58
2006/0059751 A1 3/2006 Chen et al.
(Continued)

FOREIGN PATENT DOCUMENTS

CN   101532650 A   9/2009
CN   101956938 A   1/2011
(Continued)

OTHER PUBLICATIONS

Second Office Action regarding Chinese Application No. 201510374948.8, dated May 22, 2017. Translation provided by Dragon Intellectual Property Law Firm.
(Continued)

*Primary Examiner* — Evan Dzierzynski
(74) *Attorney, Agent, or Firm* — Harness, Dickey & Pierce, P.L.C.

(57) ABSTRACT

The present disclosure relates to the field of display design, and in particular to a backlight back plate, an adhesive-metal integrated structure of the backlight source, a backlight source and a display panel. The backlight back plate includes a bottom plate and protrusions. The protrusions are arranged at an opening at a side edge of the bottom plate, which are arranged on the bottom plate and extend into an adhesive that forms an integral structure with the backlight back plate by an injection molding and being provided with a hole into which the adhesive is filled.

20 Claims, 2 Drawing Sheets

(56) References Cited

U.S. PATENT DOCUMENTS

| | | | |
|---|---|---|---|
| 2006/0109393 A1 | 5/2006 | Hsu et al. | |
| 2007/0064448 A1 | 3/2007 | Yu et al. | |
| 2013/0258702 A1* | 10/2013 | Kim | G02B 6/0091 |
| | | | 362/602 |
| 2014/0104872 A1* | 4/2014 | Shin | G09F 13/18 |
| | | | 362/607 |

FOREIGN PATENT DOCUMENTS

| | | |
|---|---|---|
| CN | 102444841 A | 5/2012 |
| CN | 102483535 A | 5/2012 |
| CN | 202371653 U | 8/2012 |
| CN | 203010423 U | 6/2013 |
| CN | 203190228 U | 9/2013 |
| CN | 104570482 A | 4/2015 |
| CN | 204404087 U | 6/2015 |
| CN | 104896385 A | 9/2015 |
| KR | 20080035240 A | 4/2008 |

OTHER PUBLICATIONS

First Office Action regarding Chinese application No. 201510374948.8, dated Sep. 20, 2016. Translation provided by Dragon Intellectual Property Law Firm.

Written Opinion of the International Searching Authority for international application No. PCT/CN2015/093817.

\* cited by examiner

BACKLIGHT BACK PLATE, ADHESIVE-METAL INTEGRATED STRUCTURE OF BACKLIGHT SOURCE, BACKLIGHT SOURCE, AND DISPLAY PANEL

CROSS-REFERENCE TO RELATED APPLICATIONS

The present application is the U.S. national phase of PCT Application PCT/CN2015/093817 filed on Nov. 5, 2015, which claims a priority of the Chinese patent application No. 201510374948.8 filed on Jun. 30, 2015, which are incorporated herein by reference in their entirety.

TECHNICAL FIELD

The present disclosure relates to the field of display design, and in particular to a backlight back plate, an adhesive-metal integrated structure of the backlight source, a backlight source and a display panel.

BACKGROUND

There is an increasing requirement for the utilization stability of a backlight source product with the development of the market. In a backlight source product of an adhesive-metal integrated structure, since a bonding area between a back plate and an adhesive that forms an integral structure with the back plate by an injection molding is small, an adhesive force of the adhesive on the back plate is relatively small. Thus, during a manufacture of the product or a use thereof, the adhesive is prone to be separated from the back plate. Especially in an adhesive-metal integrated structure in which the back plate is provided with an opening, the adhesive may be more prone to be separated from the back plate in a high-temperature environment.

In an adhesive-metal integrated structure in the related art, a through hole penetrating through the back plate in a thickness direction thereof is arranged in the back plate, so as to increases the bonding area between an adhesive frame and the back plate. FIG. 1 is a sectional view of an adhesive-metal integrated structure at a through hole of the back plate in the related art. As shown in FIG. 1, a through hole 011 is arranged in a back plate 01, an adhesive 20 is combined with the back plate 01, and a part of the adhesive 20 passes through the through hole 011 of the back plate. In this structure, a bonding area between the back plate 01 and the adhesive 20 is increased, however an adhesive force between the adhesive 20 and the back plate 01 still cannot meet the requirement of a use intensity, and thus the adhesive may still be prone to be separated from the back plate during the process of using. In such adhesive-metal integrated structure, the adhesive is prone to be separated from the back plate during a manufacture of the product or a use thereof, therefore both the production yield and the utilization stability of the backlight source product are reduced.

SUMMARY

A backlight back plate is provided in the present disclosure, by which the adhesive force between the adhesive and the back plate may be increased and the adhesive may not be easy to be separated from the back plate. As a result, both the utilization stability and the production yield of the backlight source product are improved.

In order to achieve the above object, the present disclosure provides:

a backlight back plate, including:

a bottom plate, wherein an opening is arranged at a side edge of the bottom plate, wherein a protrusion that extends from a surface of the bottom plate in a first direction is arranged at at least one side edge of the opening of the bottom plate, the protrusion is extends into an adhesive that forms an integral structure with the backlight back plate by an injection molding, and at least one hole, into which the adhesive is filled, is arranged in the protrusion, and the first direction faces toward the adhesive.

In the bottom plate of the backlight back plate, the protrusion at the side edge of the opening extends into the adhesive, and the adhesive is filled into the through hole of in protrusion. As a result, the bonding area between the adhesive and the back plate is increased, and then the adhesive force between the adhesive and the back plate is increased. In addition, a position of the adhesive is constrained by the protrusion in directions extending along a plane of the bottom plate and in a direction perpendicular to the bottom plate and away from the bonding surface of the bottom plate through which the adhesive is bonded with the bottom plate, so that the bonding between the adhesive and the back plate is more firm, and then the adhesive is not easy to be separated from the back plate, thereby improving and the utilization stability and the production yield of the backlight source product.

Alternatively, the hole in each protrusion, into which the adhesive is filled, is a through hole or a blind hole.

Alternatively, the hole in each protrusion is circular, elliptical or polygonal.

Alternatively, when the hole in each protrusion is circular, a first projection of a diameter of the hole in a direction perpendicular to the back plate is at most three quarters of a second projection of a distance from a top of the protrusion to a surface of the back plate at a side thereof away from the protrusion in the direction perpendicular to the back plate.

Alternatively, when the hole in each protrusion is circular, the first projection of the diameter of the hole in the direction perpendicular to the back plate is one half of the second projection of the distance from the top of the protrusion to the surface of the back plate at the side thereof away from the protrusion in the direction perpendicular to the back plate.

Alternatively, each protrusion is rectangular, trapezoidal or semicircular.

Alternatively, the opening at the side edge of the bottom plate is rectangular. The rectangular opening includes one first side edge and two second side edges, and the protrusions are arranged at the first side edge and uniformly spaced along the first side edge.

Alternatively, an interval between two adjacent protrusions at the first side edge is in a range from 0.5 mm to 5 mm.

Alternatively, when the protrusion is rectangular, a width of each protrusion in a direction along the first side edge of the rectangular opening is in a range from 0.5 mm to 1.5 mm.

Alternatively, a width of each protrusion in the direction extending along the first side edge of the rectangular opening is 0.8 mm, 1 mm or 1.2 mm.

Alternatively, an angle between a surface of each protrusion at a side thereof away from the opening and the bottom plate in a second direction is an acute angle, wherein the second direction is perpendicular to the at least one edge side of the opening, and away from the opening.

Alternatively, an angle between a surface of each protrusion at the side thereof away from the opening and the bottom plate is in a range from 75° to 89°.

Alternatively, at least one through hole, which penetrates through a sheet metal of the bottom plate in a thickness direction thereof, is further arranged at a periphery of the opening of the bottom plate.

Alternatively, a plurality of through holes is arranged at a side of the first side edge of the rectangular opening, and, the through holes and the protrusion are arranged alternately in a direction along the first side edge of the rectangular opening.

An adhesive-metal integrated structure of a backlight source is further provided in the present disclosure, including the backlight back plate hereinabove and an adhesive that forms an integral structure with the backlight back plate by an injection molding. Each protrusion of the backlight back plate extends into the adhesive, and forms the integral structure with the adhesive by an injection molding.

A backlight source is further provided in the present disclosure, including the adhesive-metal integrated structure of the backlight source hereinabove.

A display panel is further provided in the present disclosure, including the backlight source hereinabove.

DETAILED DESCRIPTION

The technical solutions of the present disclosure will be described clearly and completely hereinafter in conjunction with the drawings used in the embodiments. Obviously, the following embodiments merely relate to parts of, rather than all of, the described embodiments, and a person skilled in the art may obtain the other embodiments based thereon without paying off any creative work, which also fall within the scope of the present invention.

Figure 1:
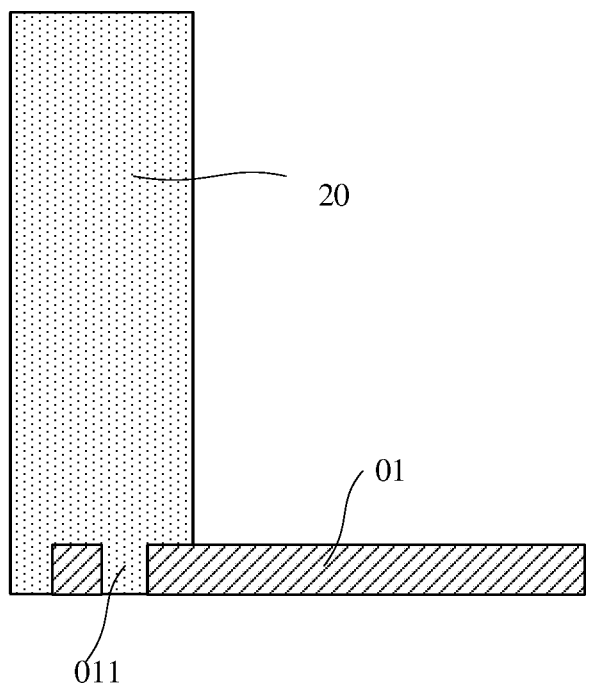
FIG. 1 is a sectional view of an adhesive-metal integrated structure of a backlight source at a through hole of the back plate in the related art.
Figure 2:
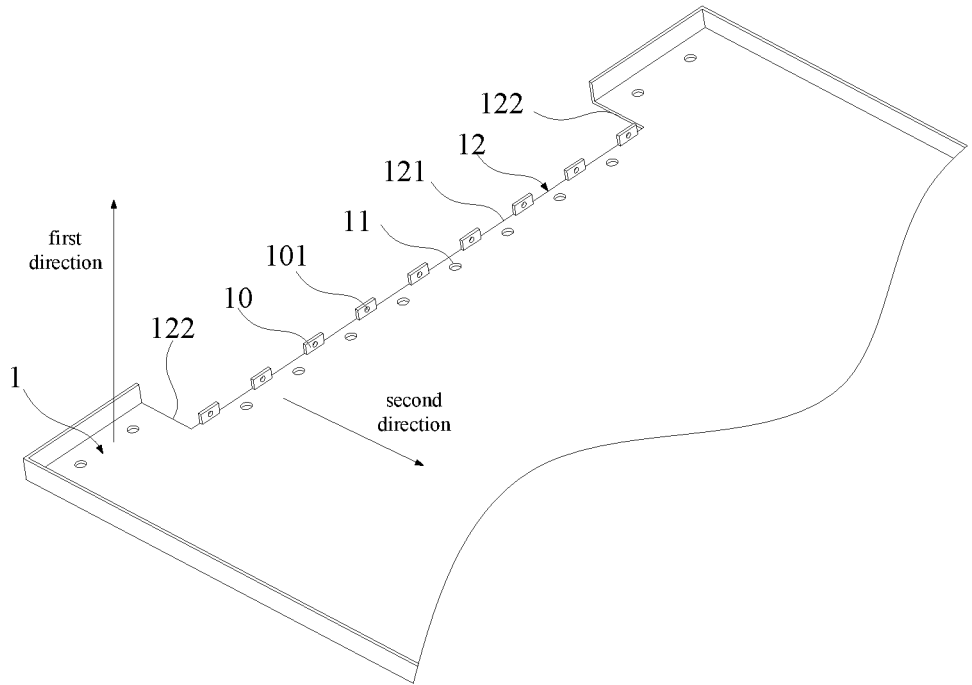
FIG. 2 is a schematic view of a part of a structure of a backlight back plate in some embodiments of the present disclosure.

As shown in FIG. 2, a backlight back plate in some embodiments of the present disclosure includes a bottom plate 1, where a rectangular opening 12 is arranged at a side edge of the bottom plate 1 and includes one first side edge 121 and two second side edges 122, the first side edge 121 is parallel to a side edge of the bottom plate 1 where the rectangular opening 12 is arranged, and the two second side edges 122 are parallel to each other and perpendicular to the first side edge 121.

In the rectangular opening 12 of the bottom plate 1, a protrusion 10 that extends from a surface of the bottom plate 1 in a first direction is arranged at the first side edge 121 of the opening 12, and a hole 101, into which the adhesive is filled, is arranged in each protrusion 10 protrusion.

The protrusion 10 in some embodiments is formed by bending a sheet metal. In the practical manufacture process of the bottom plate, the protrusion 10 may be formed by other methods such as welding and stamping according to actual production conditions.

Figure 3:
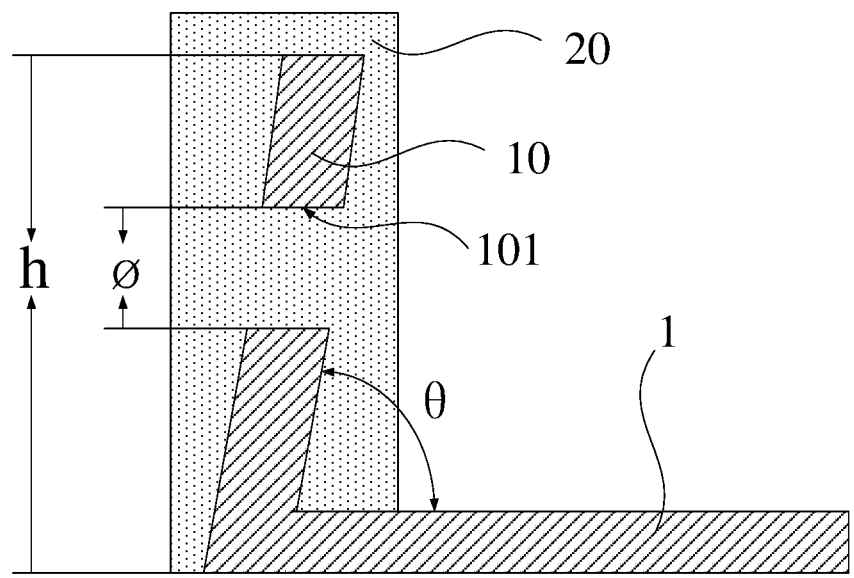
FIG. 3 is a sectional of a structure formed by bonding a backlight back plate with an adhesive at a protrusion in some embodiments of the present disclosure.

When the back plate and the adhesive are processed to form an integral structure with by an injection molding, the protrusion 10 extends into the adhesive 20, and the adhesive 20 is filled into the hole 101 in the protrusion 10, just as shown in the sectional view along a central line of the hole 101 of the protrusion 10 in FIG. 3.

In the backlight back plate, the protrusion 10 at the first side edge 121 of the rectangular opening 12 of the bottom plate 1 extends into the adhesive 20, and the adhesive 20 is filled into the hole 101 in the protrusion. As a result, the bonding area between the adhesive 20 and the back plate is increased, and then the adhesive force between the adhesive 20 and the backlight back plate is increased. In addition, a position of the adhesive 20 is constrained by the protrusions 10 in directions extending along a plane of the bottom plate 1 and in a direction perpendicular to the bottom plate 1 and away from a surface of the bottom plate 1 through which the adhesive is bonded with the bottom plate, so that the bonding between the adhesive 20 and the backlight back plate is more firm, and then the adhesive 20 is not easy to be separated from the backlight back plate, thereby improving the utilization stability and the production yield of the backlight source product.

Alternatively, in order to increase the bonding area between the adhesive and the protrusion so as to enable the protrusion to further constrain the position of the adhesive in the direction perpendicular to the bottom plate and away from the bottom plate, the hole 101 in each protrusion 10 is a through hole penetrating through a sheet metal of the protrusion 10 in a thickness direction thereof, as shown in FIG. 2.

Alternatively, in order to increase the bonding area between the adhesive and the protrusion so as to enable the protrusion to further constrain the position of the adhesive in the direction perpendicular to the bottom plate and away from the bottom plate, a plurality of holes is arranged in each protrusion.

Alternatively, during the manufacturing process of the backlight back plate, the hole in each protrusion is a blind hole according to the practical processing requirements.

During the manufacturing process of the backlight back plate, the hole in each protrusion may be circular, elliptical hole or polygonal according to the practical processing requirements. Alternatively, as shown in FIG. 2, the hole 101 in each protrusion 10 is circular. Alternatively, as shown in FIG. 3, the hole in the protrusion is circular, and a projection ø of a diameter of the hole 101 in a direction perpendicular to the back plate is at most three quarters of a projection h of a distance from a top of the protrusion 10 to a surface of the back plate 10 at a side thereof away from the protrusion 10 in the direction perpendicular to the back plate. Alternatively, ø is one half of h in a direction perpendicular to the bottom plate.

Alternative, as shown in FIG. 2, each protrusion 10 is rectangular.

Alternatively, each protrusion is semicircular.

Alternatively, in order to enable the protrusion to constrain the position of the adhesive in the direction perpendicular to the bottom plate and away from the bottom plate, each protrusion is trapezoidal, and a bottom sideline of each trapezoidal protrusion is further than a top sideline of the corresponding trapezoidal protrusion from the surface of the bottom plate through which the adhesive is bonded with the bottom plate.

Alternatively, the opening of the bottom plate may be of other shapes such as a trapezoid or a parallelogram.

Alternatively, in order to meet the requirements of a miniaturization of display panel product, an interval between two adjacent protrusions 10 at the first side edge 121 is in a range from 0.5 mm to 5 mm.

The adhesive force between the protrusion and the adhesive is inversely proportional to an angle between a surface of the protrusion at a side of the protrusion facing the interior of the bottom plate and the bottom plate in a direction facing the interior of the bottom plate, i.e. the smaller the angle is, the greater the adhesive force will be. For further increasing the adhesive force between the adhesive and the protrusion, an angle θ between the surface at the side of the protrusion 10 facing the interior of the bottom plate 1 and the bottom plate 1 in a second direction facing the interior of the bottom plate 1 is an acute angle in an alternative manner just as shown in FIG. 3, where the second direction is perpendicular to the first side edge 121 and away from the rectangular opening 12. Alternatively, θ is in a range from 75° to 89°.

Alternatively, for meeting the requirements of a miniaturization of display panel product, a width of each protrusion in a direction extending along the first side edge of the rectangular opening is in a range from 0.5 mm to 1.5 mm.

Specifically, the width of the protrusion in a direction extending along the side edge of the rectangular opening is 0.8 mm, 1 mm and 1.2 mm.

Alternatively, in order to further increase the bonding area between the adhesive and the back plate so as to increase the bonding force there between, through holes 11 in the bottom plate, which penetrate through the sheet metal of the bottom plate 1 in a thickness direction thereof are further arranged at a side of the first side edge 11 of the rectangular opening 12 of the bottom plate 1, and the through holes 11 and the protrusions 10 of the bottom plate are arranged alternately and uniformly in a direction along the first side edge 121 of the rectangular opening 12.

The present disclosure further provides an adhesive-metal integrated structure of the backlight source, including the backlight back plate hereinabove and an adhesive that forms an integral structure with the backlight back plate by an injection molding. Each protrusion of the backlight back plate extends into the adhesive and forms an integral structure with the adhesive by an injection molding.

In the adhesive-metal integrated structure of the backlight source, the protrusions at the side edge of the rectangular opening of the bottom plate of the backlight back plate extend into the adhesive and form an integral structure with the adhesive by an injection molding, therefore the bonding area between the adhesive and the back plate is increased, and then the adhesive force between the adhesive and the back plate is increased. In addition, a position of the adhesive is constrained by the protrusions in the directions extending along the plane of the bottom plate and in the direction perpendicular to the bottom plate and away from a surface of the bottom plate through which the adhesive is bonded with the bottom plate, so that the bonding between the adhesive and the back plate is more firm, and then the adhesive is not easy to be separated from the back plate, thereby improving the utilization stability and the production yield of backlight source products.

A backlight source is further provided in the present disclosure, which includes the adhesive-metal integrated structure of the backlight source hereinabove.

A display panel is further provided in the present disclosure, which includes the backlight source hereinabove.

Obviously, a person skilled in the art may make further modifications and improvements to the present invention without departing from the principle of the present invention. Then, if these modifications and improvements of the present disclosure fall within the scope of the claims of the present invention and equal techniques, the present disclosure intends to include the modifications and improvements.

What is claimed is:

1. A backlight back plate, comprising
a bottom plate, wherein an opening is arranged at a side edge of the bottom plate,
wherein a protrusion that extends from a surface of the bottom plate in a first direction is arranged at at least one side edge of the opening of the bottom plate,
the protrusion extends into an adhesive that forms an integral structure with the backlight back plate by an injection molding, and at least one hole, into which the adhesive is filled, is arranged in the protrusion, and
the first direction faces toward the adhesive.

2. The backlight back plate according to claim 1, wherein the hole in each protrusion, into which the adhesive is filled, is a through hole or a blind hole.

3. The backlight back plate according to claim 1, wherein the hole in each protrusion is circular, elliptical or polygonal.

4. The backlight back plate according to claim 3, wherein the hole in each protrusion is circular, a first projection of a diameter of the hole in a direction perpendicular to the back plate is at most three quarters of a second projection of a distance from a top of the protrusion to a surface of the back plate at a side thereof away from the protrusion in the direction perpendicular to the back plate.

5. The backlight back plate according to claim 4, wherein the first projection of the diameter of the circular hole in the direction perpendicular to the back plate is one half of the second projection of the distance from the top of the protrusion to the surface of the back plate at the side thereof away from the protrusion in the direction perpendicular to the back plate.

6. The backlight back plate according to claim 1, wherein each protrusion is rectangular, trapezoidal or semicircular.

7. The backlight back plate according to claim 6, wherein each protrusion is rectangular, a width of each protrusion in a direction along a first side edge of the rectangular opening is in a range from 0.5 mm to 1.5 mm.

8. The backlight back plate according to claim 7, wherein a width of each protrusion in the direction along the first side edge of the rectangular opening is 0.8 mm, 1 mm or 1.2 mm.

9. The backlight back plate according to claim 1, wherein the opening is rectangular, and the rectangular opening comprises one first side edge and two second side edges, the protrusions are arranged at the first side edge and uniformly spaced along the first side edge.

10. The backlight back plate according to claim 9, wherein an interval between two adjacent protrusions at the first side edge is in a range from 0.5 mm to 5 mm.

11. The backlight back plate according to claim 1, wherein an angle between a surface of each protrusion at a side thereof away from the opening and the bottom plate in a second direction is an acute angle, wherein the second direction is perpendicular to the at least one edge side of the opening and away from the opening.

12. The backlight back plate according to claim 11, wherein an angle between a surface of each protrusion at the side thereof away from the opening and the bottom plate is in a range from 75° to 89°.

13. The backlight back plate according to claim 1, wherein at least one through hole, which penetrates through a sheet metal of the bottom plate in a thickness direction thereof, is further arranged at a periphery of the opening of the bottom plate.

14. The backlight back plate according to claim 13, wherein a plurality of through holes is arranged at a side of the first side edge of the rectangular opening, and the through holes and the protrusions are arranged alternately in a direction along the first side edge of the rectangular opening.

15. An adhesive-metal integrated structure of a backlight source, comprising a backlight back plate according to claim 1 and an adhesive that forms an integral structure with the backlight back plate by an injection molding, wherein each protrusion of the backlight back plate extends into the adhesive, and forms an integral structure with the adhesive by an injection molding.

16. A backlight source, comprising the adhesive-metal integrated structure of a backlight source according to claim 15.

17. A display panel, comprising the backlight source according to claim 16.

18. The adhesive-metal integrated structure of a backlight source according to claim 15, wherein the hole in each protrusion, into which the adhesive is filled, is a through hole or a blind hole.

19. The adhesive-metal integrated structure of a backlight source according to claim 15, wherein the opening is rectangular, and the rectangular opening comprises one first side edge and two second side edges, the protrusions are arranged at the first side edge and uniformly spaced along the first side edge.

20. The adhesive-metal integrated structure of a backlight source according to claim 19, wherein each protrusion is rectangular, a width of each protrusion in a direction along a first side edge of the rectangular opening is in a range from 0.5 mm to 1.5 mm.

* * * * *